(12) United States Patent
Hirata

(10) Patent No.: US 6,449,109 B1
(45) Date of Patent: *Sep. 10, 2002

(54) RECORDING AND REPRODUCING APPARATUS

(75) Inventor: Noritsugu Hirata, Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/499,700

(22) Filed: Feb. 7, 2000

Related U.S. Application Data

(62) Division of application No. 09/173,943, filed on Oct. 16, 1998, now Pat. No. 6,052,242, which is a continuation of application No. 07/950,738, filed on Sep. 24, 1992, now Pat. No. 5,907,443, which is a continuation of application No. 07/530,835, filed on May 30, 1990, now abandoned.

(30) Foreign Application Priority Data

Jun. 7, 1989 (JP) .............................................. 1-142907

(51) Int. Cl.$^7$ ............................. G11B 5/86; G11B 15/04
(52) U.S. Cl. ............................. 360/15; 360/60; 386/94; 380/203
(58) Field of Search ............................. 360/15, 60, 132, 360/74.4, 73.04, 137; 386/94, 46, 1; 380/203, 201, 202; 242/197–200; 235/449, 454

(56) References Cited

U.S. PATENT DOCUMENTS

| | | | | |
|---|---|---|---|---|
| 4,366,511 A | * | 12/1982 | Ranalli | 360/39 |
| 4,586,100 A | * | 4/1986 | Howe et al. | 360/128 |
| 4,593,337 A | * | 6/1986 | Leone et al. | 360/137 |
| 4,626,931 A | * | 12/1986 | Hori et al. | 360/16 |
| 4,707,750 A | * | 11/1987 | Anderson et al. | 360/60 |
| 4,802,048 A | * | 1/1989 | Perkins et al. | 360/132 |
| 4,888,798 A | * | 12/1989 | Earnest | 380/4 |
| 4,965,680 A | * | 10/1990 | Endoh | 360/60 |
| 5,014,234 A | * | 5/1991 | Edwards, Jr. | 364/900 |
| 5,057,947 A | * | 10/1991 | Shimada | 360/60 |
| 5,111,442 A | * | 5/1992 | Nakajima et al. | 369/54 X |
| 5,130,879 A | * | 7/1992 | Weiley | 360/132 |
| 5,159,502 A | * | 10/1992 | Eijima et al. | 360/62 |
| 5,227,926 A | * | 7/1993 | Nagaoka et al. | 360/15 |
| 5,477,276 A | * | 12/1995 | Ogura | 348/596 |
| 5,907,443 A | * | 5/1999 | Hirata | 360/60 |
| 6,052,242 A | * | 4/2000 | Hirata | 360/15 |

\* cited by examiner

Primary Examiner—Andrew L. Sniezek
(74) Attorney, Agent, or Firm—Robin, Blecker & Daley

(57) ABSTRACT

A recording and reproducing apparatus comprising a reproducing member for reproducing number-of-times-of-copy information and possible-number-of-times-of-copy information recorded on a recording medium, a renewing circuit for renewing the number-of-times-of-copy information reproduced by the reproducing member, a determining circuit for determining whether or not it is possible to perform copying by comparing the possible-number-of-times-of-copy information with the number-of-times-of-copy information, and a recording member for recording the number-of-times-of-copy information renewed by the renewing circuit on the recording medium.

8 Claims, 4 Drawing Sheets

RECORDING AND REPRODUCING APPARATUS

CROSS-REFERENCE TO RELATED APPLICATIONS

This application is a divisional of application Ser. No. 09/173,943, filed Oct. 16, 1998 now U.S. Pat. No. 6,052, 242, which is a continuation of application Ser. No. 07/950, 738, filed Sep. 24, 1992 now U.S. Pat. No. 5,907,443, which is a continuation of application Ser. No. 07/530,835, filed May 30, 1990, now abandoned.

BACKGROUND OF THE INVENTION

1. Field of the Invention

This invention relates to recording and reproducing apparatuses and, more particularly, to a recording and reproducing apparatus capable of limiting copy of digital signals.

2. Description of the Related Art

In the past, in the recording and reproducing apparatus, for example, VTRS, no copy limitation was positively made. To take copies was, therefore, free and, from the point of view of copyright protection, gave rise to a problem. In the case of the analog signal recording type VTR, because the image quality in S/N, resolution, etc. deteriorates with the increase of the number of times the copying has been recycled, the freedom of copying was allowed to some extent. In the case of the digital signal recording type VTR, no deterioration of the image quality takes place by copying (dubbing). Hence, the number of copyright issues is increasing. Yet, any effective method for copy limitation has so far not been disclosed.

In the conventional recording and reproducing apparatus, it is conceivable in the case of, for example, the digital signal recording type VTR that the problem of copyright is averted by performing all connection between the instruments for use in copying through an input/output system for analog signals. If so, the advantage of having no influence of dubbing in the digital signal recording is lost.

Also, it is primarily desirable that as far as what the user has created by himself is concerned, the right of deciding whether or not it is possible to copy the source tape (original tape) is given to the user himself.

SUMMARY OF THE INVENTION

An object of the present invention is to provide a recording and reproducing apparatus which has overcome such problems as described above and can carry out copying with an effective limitation that meets the demands in reality.

To achieve such an object, according to the invention, in an embodiment thereof, a recording and reproducing apparatus comprises reproducing means for reproducing number-of-times-of-copy information and possible-number-of-times-of-copy information recorded on a recording medium, renewing means for renewing the number-of-times-of-copy information reproduced by the reproducing means, determining means for comparing the possible-number-of-times-of-copy information and the number-of-times-of-copy information with each other to determine whether or not it is possible to perform copying, and recording means for recording the number-of-times-of-copy information which has been renewed by the renewing means on the recording medium.

With the use of the recording and reproducing apparatus according to the embodiment of the invention, as the possible-number-of-times-of-copy information has been recorded, the number of times which the copying can be performed can be limited, or the copying can be prohibited.

Other objects and features of the present invention will become apparent from the following written specification and drawings.

DETAILED DESCRIPTION OF THE PREFERRED EMBODIMENT

The invention is next described in connection with an embodiment thereof by reference to the drawings.

Figure 1:
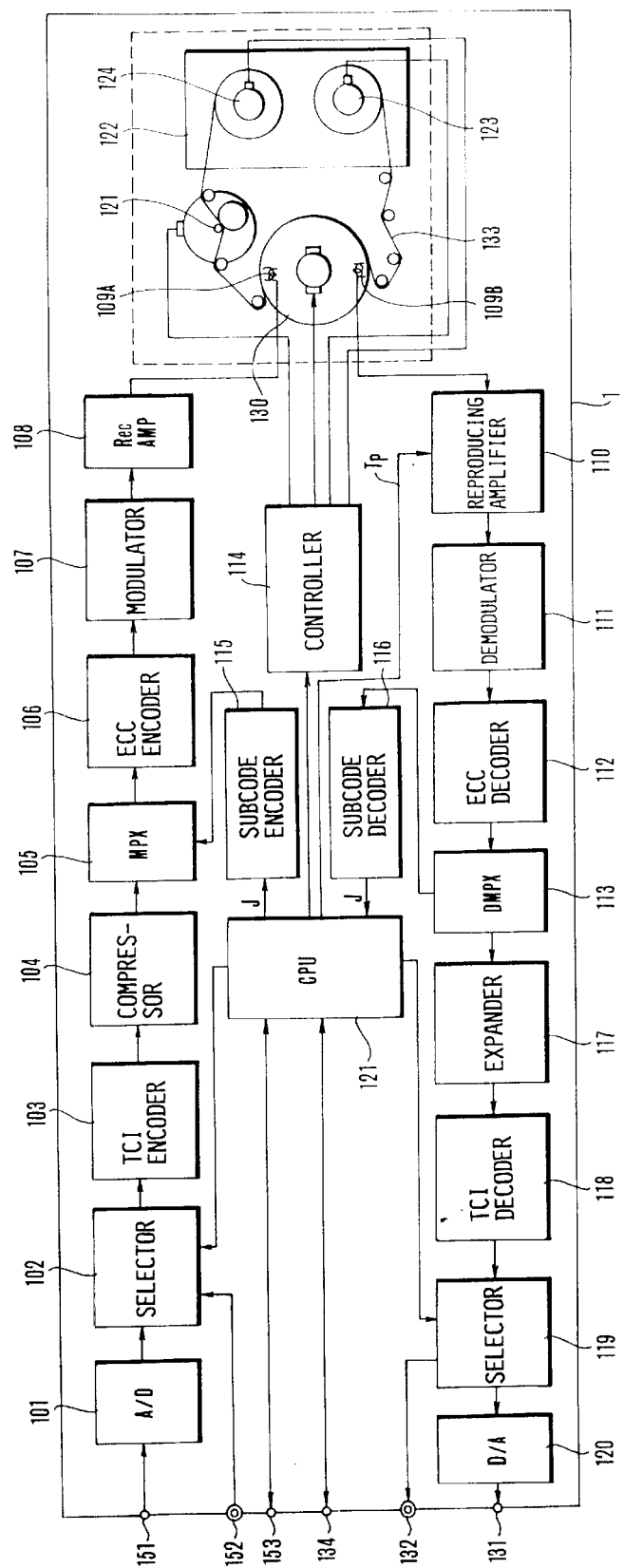
FIG. 1 is a block diagram of an embodiment of a magnetic recording and reproducing apparatus according to the invention.

FIG. 1 shows one embodiment of the invention.

Reference numeral 1 denotes a VTR body having an analog input terminal 151 for receiving analog signals including analog video signals and audio signals, a digital input terminal 152 for receiving digital signals including digital video signals and audio signals, and a copy request input/output terminal 153 arranged, when the VTR is used as the source-side deck, to supply a copy request signal from the copy-side deck to a CPU 121, or when the VTR is used as the copy-side deck, to supply a copy request signal from the CPU 121 to the source-side deck according to the operation of an operation part (not shown) connected to the CPU 121. Further, when the VTR is used as the copy-side deck, if the copy request signal is not produced, an output prohibition command is given to a multiplexer 102 by the CPU 121, so that no recording signals are produced.

The analog video signal (including the audio signal) received at the input terminal 151 passes through an A/D converter 101, a selector 102, a TCI encoder 103, a data compressor 104, a multiplexer (MPX) 105, an ECC encoder 106, a modulator 107 and a recording amplifier (Rec AMP) 108 to enter a recording head 109A mounted on a rotary drum 130, by which it is recorded as a series of digital data on a video tape 133. The A/D converter 101, the selector 102, the TCI encoder 103, the data compressor 104, the multiplexer (MPX) 105, the ECC encoder 106, the modulator 107, the recording amplifier (Rec AMP) 108 and the recording head 109A constitute a recording means.

When the input signal is a digital signal, the digital signal is supplied through the input terminal 152 directly to the selector 102. The actual form of the input signal comprises a plurality of channels for a set of R, G and B, or another set of Y, $C_N$ and $C_W$, along with digital audio signals, though in the drawing they are represented by only one signal line.

A subcode encoder 115 generates a subcode including control code values J and $J_0$ to be recorded on the tape. The control code values J and $J_0$ will be more fully described later.

Figure 2:
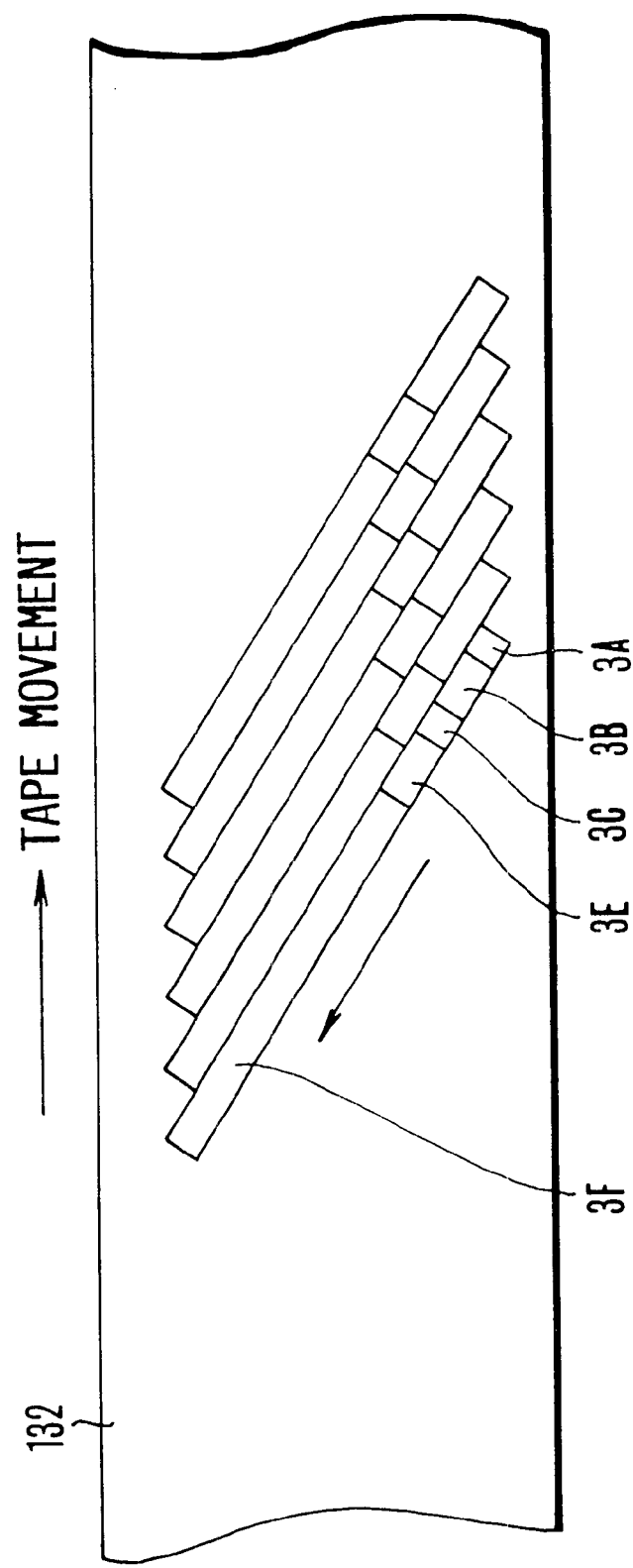
FIG. 2 is a plan view of an example of the pattern recorded on the magnetic tape by the apparatus of FIG. 1.
Figure 3:
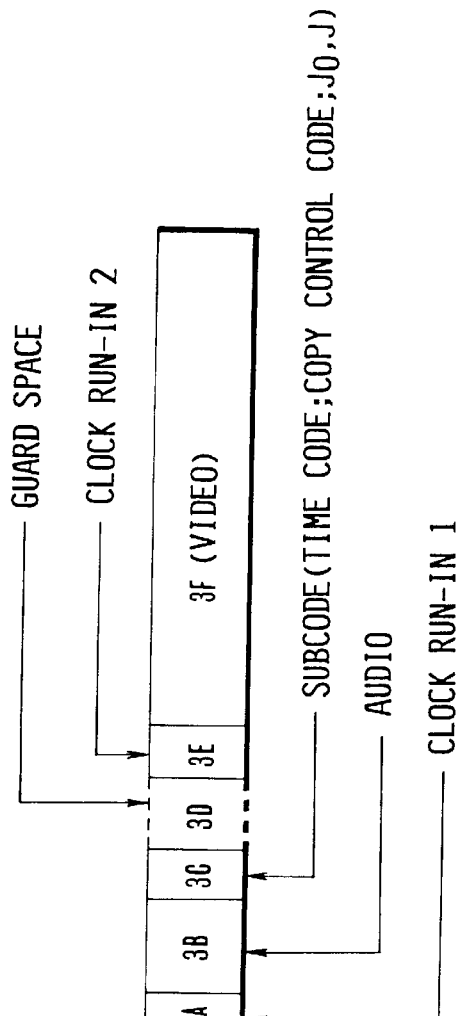
FIG. 3 is a diagram of the patterns in the recorded data area.

This subcode including the control code values J and $J_0$ is processed by the multiplexer 105 so that its output timing differs in time from that of the video signal, the audio signal and data such as a time code, and the subcode are recorded at a position 3C in each track on the tape as shown in FIG. 2 and FIG. 3.

FIG. 2 shows recording tracks formed on the tape 133 by the recording head 109A. FIG. 3 shows recording areas of each of the recording tracks.

A reproducing head 109B is arranged to trace each track while preceding the recording head 109A by at least one track. The reproduced signal output from the reproducing head 109B passes through a reproducing equalizer amplifier 110, a demodulator 111, an ECC decoder 112, a demultiplexer 113, a time-base expander 117, a TCI decoder 118, a selector 119 and a D/A converter 120 to be output from an output terminal 131. The reproducing head 109B, the reproducing equalizer amplifier 110, the demodulator 111, the ECC decoder 112, the demultiplexer 113, the time-base expander 117, the TCI decoder 118, the selector 119, the D/A converter 120 constitute a reproducing means.

A subcode decoder 116, in a reproduction mode, decodes the subcode including the copy control code values $J_0$ and $J$ recorded in each field, and its output is supplied to the CPU 121.

The CPU 121 determines whether or not it is possible to perform the copying, in other words, whether or not the digital signal is allowed to be output, according to the decoded control code values $J_0$ and $J$, and further renews the control code values $J_0$ and $J$.

In a case where the digital signal is allowed to be output, the CPU 121 commands the selector 119 to supply the digital video and audio signals directly to a digital output terminal 132.

Here, the control code values $J_0$ and $J$ are briefly explained.

The value $J_0$ is data representing the possible number of times of copy. This is determined at the time of recording on the original tape, and is recorded in the recording area 3C on the tape. The other value $J$ is data representing the number of times of copy. This is set to "0" at the time of recording on the original tape. If the value $J_0$ is "0", copying cannot be performed at all. In a specific embodiment of the invention, if the value $J_0$ is "8", the copy limitation is not imposed at all.

The various values $J_0$ are related to the values of the allowable number of times of copy, as summarized in Table 1.

It is to be noted that the copy limitation by the aforesaid value $J_0$ is imposed on the digital output, and does not work on copying of the analog output.

It is also to be noted that the value $J_0$ is not restricted to the values exemplified in Table 1, but may take any other values "0" or more.

TABLE 1

| $J_0$ | Allowable Number of Times of Copy |
| --- | --- |
| 1 | Once |
| 2 | Twice |
| N < 8 | N times |
| 8 | Copy Free (Any times without limit) |

Therefore, on the source tape, the value $J_0$ representing the possible number of times of copy and the value $J$ which progressively increases accoding to the number of times of output of copy are previously recorded in the position 3C shown in FIG. 3. These values are recorded as eight-bit data whose four least significant bits are assigned to the value $J_0$ and whose four most significant bits are assigned to the progressively increasing value $J$.

The fundamental concept of the present embodiment is that whether or not the present copying is prohibited is determined based on the control code values $J_0$ and $J$ reproduced and decoded by the source-side deck, and the control code values $J$ and $J_0$ are renewed as shown in Table 2 in order to rewrite the control code values recorded on the tape of the source-side deck and to record these renewed control code values as the control code values to be recorded on the tape of the copy-side deck.

TABLE 2

| | | Recorded Values on Tpea | |
| --- | --- | --- | --- |
| | | Source Tape | Copy Tape |
| $J_0$ | Before Copy | $J_0 = N$ | |
| | After Copy | $J_0 = N$ | $J_0 = N$ |
| $J$ | Before Copy | $J = n$ | |
| | After Copy | $J = n + 1$ | $J = n + 1$ |

(n is an integer less than N)

The above-described process is explained below.

Figure 5:
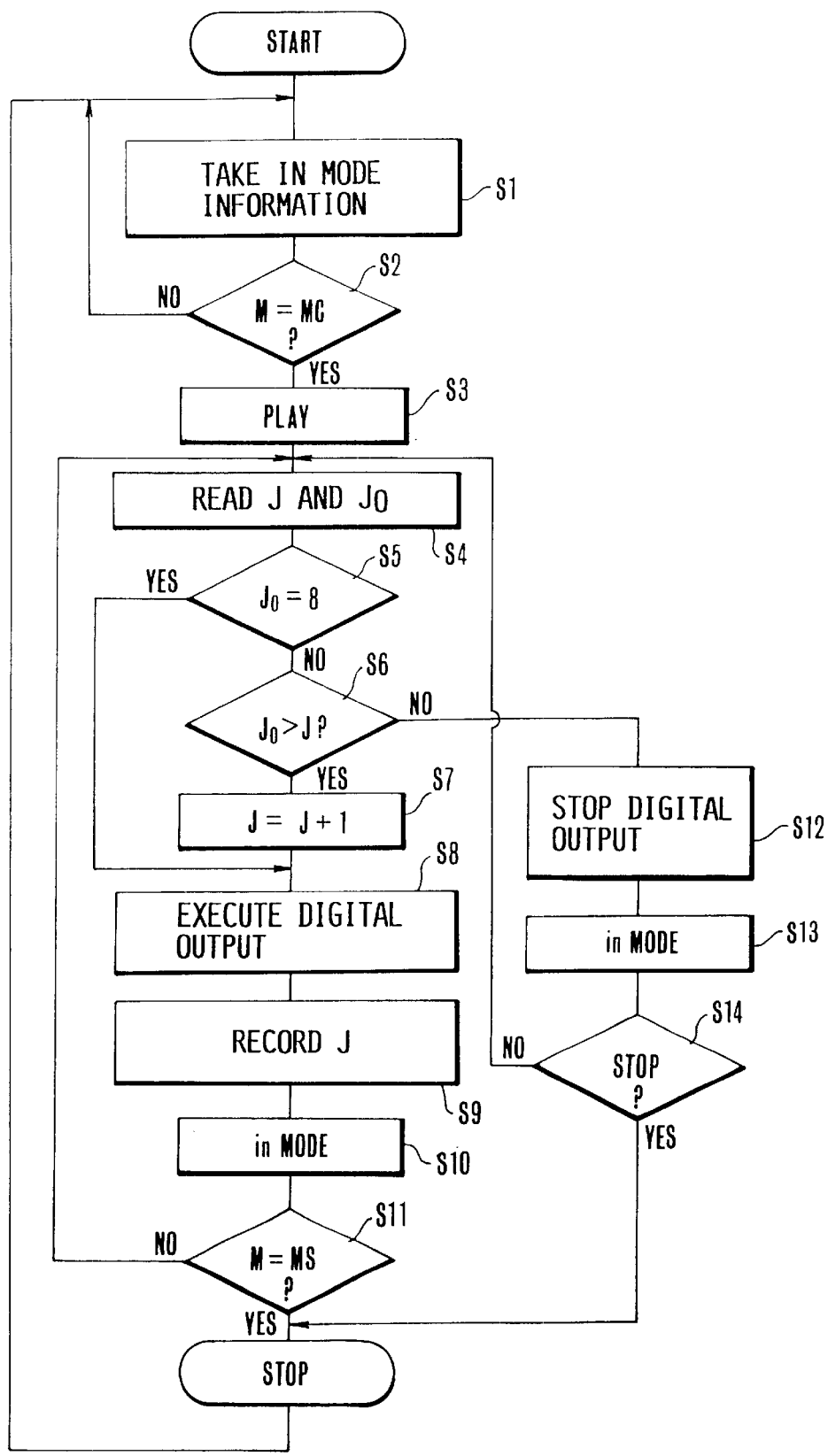
FIG. 5 is a flowchart for the copy control program by the CPU 121.

FIG. 5 is a flowchart showing an example of the copy control process by the CPU 121 as the VTR of FIG. 1 is utilized as the source-side deck.

Figure 4:
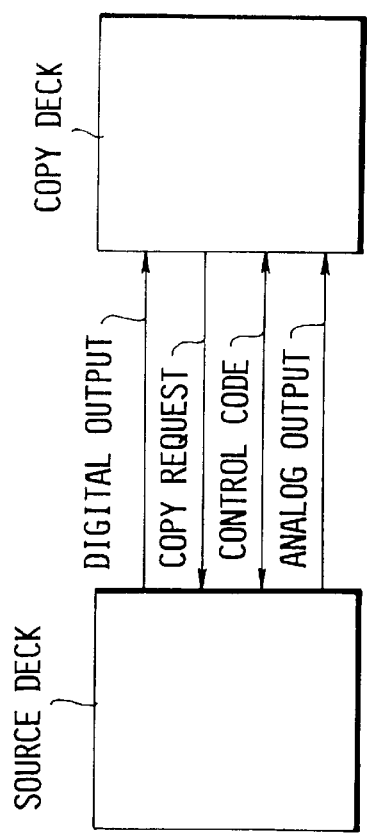
FIG. 4 shows an example of the connection between the source deck and the copy deck.

The source-side desk and the the copy-side desk are connected to each other as shown in FIG. 4.

The CPU 121 takes in mode information M in a step S1. Whether or not the source-side deck and the copy-side deck are already set to operate in the copy mode MC is judged by checking the presence or absence of the copy request signal in a step S2. If the judgment result is that the copy mode MC is operating, that is, M=MC, the process advances to a step S3 where both decks are brought into synchronism and, as they stand in this state, they are simultaneously brought into the reproduction mode. At this time, a control signal corresponding to the reproduction mode is sent to a controller 114 for a drum motor, a capstan motor 121, reel motors 123 and 124, etc. To the reproducing equalizer amplifier 110, a read timing signal $T_R$ is sent, for the purpose of reading the recording area shown in FIG. 3 on the magnetic tape which contains the subcode corresponding to the values $J_0$ and $J$. Then, in a step S4, the value $J_0$ and the value $J$ which are reproduced and decoded by each field (track) are read in a RAM within the CPU 121. Then, the read value $J_0$ is transferred to and stored in a register within the CPU 121 and whether this value $J_0$ is "8" or not is determined in a step S5.

Then, if the judgment results in not $J_0$=8, in other words, in $J_0$<8, the $J_0$-times-copy-allomable mode is found. So, the value $J_0$ is compared with the reproduced value $J$ in a step S6. If $J_0$>$J$, it is then made possible to perform copying. After this, the process advances to a step S7. In the step S7, the value $J$ is counted up as J=J+1. Thus, the digital output is allowed in a step S8. In a step S9, the renewed value $J$ is recorded in the track which has been just read in replacement of the old value $J$ by the recording head 109A that is tracing in such a way as to follow up the reproducing head 109B.

At this time, the value $J_0$ and the renewed value $J$ are supplied through the terminal 134 to the copy-side deck and recorded on the recording area 3C of the copy tape by the copy-side deck along with the digital signal output from the terminal 132.

Subsequently, the mode information M is taken in at a step S10, and then whether or not the taken-in mode is the stop mode is judged in a step S11. If the judgment results in the stop mode MS, the apparatus is brought into the stop mode. Thus, the processing is ended. If the mode information M is not the stop mode MS, the process returns to the step S4 and the next track is treated in a similar manner.

In the step S5, if the judgment results in $J_0=8$, or copy free, on the other hand, the process advances to a step S8 where the copy-allowable mode is selected to operate. Thus, the digital output is allowed. As to the value J, it is not rewritten. The procedure from the step S9 to the step S11 operates in a similar manner except that the value $J_0$ and the value J are recorded only on the copy tape in the step S9.

Meanwhile, in the step S6, if the judgment results in $J_0>J$, the process advances to a step S12 where the digital output is stopped. In a step S13, the mode is taken in. Then, whether or not the taken-in mode is the stop mode is judged in a step S14. If the judgment results in not the stop mode, the process returns to the step S4 to treat the next track. And, if the judgment in the step S14 results in the stop mode, the apparatus is brought into the stop mode. Thus, the processing is ended.

Since the possibility of taking copies and the possible number of times of copy are controlled by each recording track, not only for a series of continuous motion picture frames, but also for still picture data of a smaller size than one field, the copy control can be made.

Though the foregoing embodiment has been described in connection with an example of using the same values for the parameters J and $J_0$ to be recorded on the source tape (original tape) and the copy tape, variation may be made. In another embodiment shown in Table 3, after a copying operation is started, the values J and $J_0$ which are to be recorded in the source-side deck and the values J and $J_0$ which are to be recorded in the copy-side deck are made different from each other when they are output. For the tape obtained by the copying, in any case, $J_0=0$ is set to prevent-the second and later generations of copy from occurring. With the use of such a measure, therefore, the source tape that, for example, was bought is allowed to be used for taking a predetermined number of copies therefrom, but the copy tape that was obtained from the source tape can no longer be used for taking any more copies therefrom.

TABLE 3

|  | Before Copy | | After Copy | |
| --- | --- | --- | --- | --- |
| Source Tape | $J_0 = 4$ | $J = m$ | $J_0 = 4$ | $J = m + 1$ |
| Copy Tape | — | — | $J_0 = 0$ | $J = *$ |

*: Arbitrary

Hence, it becomes possible to solve the problem of protecting the copyright against the copying capability of the VTR that has so far been serious. This is very advantageous not only to industry but also from the standpoint of protecting the cultural properties.

It should be noted that the invention is applicable not only to such VTRs as described above but also to the ordinary copying machines. In the latter case, the values $J_0$ and J are recorded (copied, or printed) in the form of bar codes in a predetermined position (for example, back side) of an original manuscript, while the copying machine is provided with a bar code reader as the reading means.

As has been described above, according to the recording and reproducing apparatus of the invention, its features described above have a great advantage that the copy limitation that is commensurate with the real situations can be realized.

What is claimed is:

1. A reproducing apparatus, comprising:
   (a) a reproducing unit which reproduces image information and copy control information for controlling a possible number of copying the image information frown a recording medium; and
   (b) a controlling unit which determines whether the reproduced image information can be copied or not, based on the reproduced copy control information, before the reproduced image information is inputted into an external recording apparatus,
      wherein said controlling unit prevents to output the reproduced image information and the reproduced copy control information from a digital output unit to the external recording apparatus, if said controlling unit determines that the reproduced image information cannot be copied, and
      wherein said controlling unit renews the reproduced copy control information, and permits to output the reproduced image information and the renewed copy control information from the digital output unit to the external recording apparatus, if said controlling unit determines that the reproduced image information can be copied.

2. A reproducing apparatus according to claim 1, wherein said controlling unit renews the reproduced copy control information to reduce one or more number of the possible number.

3. A reproducing apparatus according to claim 1, wherein the copy control information also controls a possible number of copying audio information corresponding to the image information.

4. A reproducing apparatus according to claim 1, wherein said controlling unit records the renewed copy control information on the recording medium in lieu of the reproduced copy control information, if said controlling unit determines that the reproduced image information can be copied.

5. A reproducing method, comprising the steps of:
   (a) reproducing image information and copy control information for controlling a possible number of copying the image information from a recording medium;
   (b) determining whether the reproduced image information can be copied or not, based on the reproduced copy control information, before the reproduced image information is inputted into an external recording apparatus;
   (c) preventing to output the reproduced image information and the reproduced copy control information from a digital output unit to the external recording apparatus, if said determining step determines that the reproduced image information cannot be copied;
   (d) renewing the reproduced copy control information, if said deter step determines that the reproduced image information cam be copied; and
   (e) permitting to output the reproduced image information and the renewed copy control information from the digital output unit to the external recording apparatus, if said determining step determines that the reproduced image information can be copied.

6. A reproducing method according to claim 5, wherein said renewing step renews the reproduced copy control information to reduce one or more number of the possible number.

7. A reproducing method according to claim 5, wherein the copy control information also controls a possible number of copying audio information correspond to the image information.

8. A reproducing method according to claim 5, further comprising the step of recording the renewed copy control information on the recording medium in lieu of the reproduced copy control information if said determining step determines that the reproduced image information can be copied.

* * * * *

UNITED STATES PATENT AND TRADEMARK OFFICE
CERTIFICATE OF CORRECTION

PATENT NO. : 6,449,109 B1
DATED : September 10, 2002
INVENTOR(S) : Noritsugu Hirata It is certified that error appears in the above-identified patent and that said Letters Patent is hereby corrected as shown below:

Title page,
Item [54], delete in its entirety and insert -- REPRODUCING APPARATUS WITH COPY CONTROL --.
Item [62], delete "continuation" and insert -- divisional --.

Column 1,
Lines 18 and 22, delete "copy" and insert -- copying --.
Line 39, before "influence" delete "no".
Line 48, before "overcome" insert -- to --.
Line 51, delete "meets the demands on reality" and insert -- meets practical demands --.

Column 2,
Line 20, after "control" delete "program".
Line 42, delete "102" and insert -- 105 --.

Column 3,
Line 66, delete "accoding" and insert -- according --.

Column 4,
Line 54, delete "J -times-copy-allomable" and insert -- J -times-copy-allowable --.

Column 6,
Line 2, delete "the real situations" and insert -- reality --.
Line 57, delete "deter" and insert -- determining --.

Signed and Sealed this

Eighteenth Day of November, 2003

JAMES E. ROGAN
*Director of the United States Patent and Trademark Office*